United States Patent
Hammoud et al.

(10) Patent No.: US 9,604,607 B2
(45) Date of Patent: Mar. 28, 2017

(54) METHOD AND DEVICE FOR AUTONOMOUS BRAKING OF A VEHICLE FOLLOWING COLLISION

(71) Applicant: FORD GLOBAL TECHNOLOGIES, LLC, Dearborn, MI (US)

(72) Inventors: Hassen Hammoud, Dearborn, MI (US); Jianbo Lu, Northville, MI (US); Gilberto Burgio, Trento (IT); Todd N. Clark, Dearborn, MI (US); Otto Hofmann, Erfstadt (DE); Mohsen Lakehal-Ayat, Aachen (DZ); Shweta M. Farmer, Keego Harbor, MI (US); Jason Shomsky, Taylor, MI (US); Roland Schaefer, Haan (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/927,733

(22) Filed: Oct. 30, 2015

(65) Prior Publication Data
US 2016/0046266 A1    Feb. 18, 2016

Related U.S. Application Data

(63) Continuation of application No. 14/489,787, filed on Sep. 18, 2014, now Pat. No. 9,205,815, which is a (Continued)

(30) Foreign Application Priority Data

Mar. 9, 2012 (DE) .................. 10 2012 203 733

(51) Int. Cl.
*B60T 7/22* (2006.01)
*G05D 1/00* (2006.01)
(Continued)

(52) U.S. Cl.
CPC ........ *B60T 7/22* (2013.01); *B60T 7/12* (2013.01); *B60T 8/172* (2013.01); *G05D 1/0088* (2013.01); *B60T 8/1755* (2013.01)

(58) Field of Classification Search
CPC ... B60T 7/12; B60T 7/22; B60T 8/172; B60T 8/1755; G05D 1/0088
USPC .................................................. 701/70
See application file for complete search history.

(56) References Cited

U.S. PATENT DOCUMENTS 3,810,520 A      5/1974  Iwata et al.
5,699,040 A  *  12/1997  Matsuda ............... B60Q 9/008
                                                    180/169

(Continued)

FOREIGN PATENT DOCUMENTS

DE    102004055399 A1    5/2006
DE    102004058814 A1    6/2006
(Continued)

OTHER PUBLICATIONS

Examination Report dated Feb. 4, 2013 for priority German Application 102012203733.0 filed Mar. 9, 2012.

*Primary Examiner* — Tyler J Lee
(74) *Attorney, Agent, or Firm* — Raymond L. Coppiellie; Brooks Kushman P.C.

(57) ABSTRACT

A method of controlling a vehicle includes providing a vehicle having a brake system configured to operate according to a nominal mode in which applied braking pressure is based on a driver braking request, a first active braking mode in which applied braking pressure is based on maximum ABS braking pressure and decreased in response to a driver brake pedal release, and a second active braking mode in which applied braking pressure is based on maximum braking pressure. In response to a detected collision, the system is controlled according to the first active braking mode. In response to the first active braking mode being active and no (Continued)

driver braking request being anticipated, the system is controlled according to the second active braking mode. In response to the first or second active braking modes being active and a termination criterion being satisfied, the system is controlled according to the nominal mode.

15 Claims, 6 Drawing Sheets

Related U.S. Application Data continuation of application No. 13/791,526, filed on Mar. 8, 2013, now Pat. No. 8,903,620.

(51) Int. Cl.
*B60T 8/172* (2006.01)
*B60T 7/12* (2006.01)
*B60T 8/1755* (2006.01)

(56) References Cited

U.S. PATENT DOCUMENTS

| | | | | |
|---|---|---|---|---|
| 6,017,102 A * | 1/2000 | Aga | ............... | B60T 7/12 303/125 |
| 6,131,063 A * | 10/2000 | Seki | ............... | B60T 8/3275 340/575 |
| 6,267,194 B1 * | 7/2001 | Bullinger | ............... | B60T 7/22 180/275 |
| 6,474,753 B1 * | 11/2002 | Rieth | ............... | G05G 1/38 180/271 |
| 6,530,450 B2 | 3/2003 | DeLuca et al. | | |
| 7,018,004 B2 | 3/2006 | Chen et al. | | |
| 8,146,703 B2 | 4/2012 | Baumann et al. | | |
| 8,180,531 B2 | 5/2012 | Lucas et al. | | |
| 8,185,273 B2 | 5/2012 | Lich et al. | | |
| 8,706,372 B2 | 4/2014 | Cetinkaya et al. | | |
| 2002/0020575 A1 | 2/2002 | DeLuca et al. | | |
| 2002/0112912 A1 | 8/2002 | Napier et al. | | |
| 2009/0038873 A1 | 2/2009 | Lucas et al. | | |
| 2010/0300794 A1 | 12/2010 | Stabrey | | |
| 2011/0264347 A1 | 10/2011 | Cetinkaya | | |
| 2011/0264348 A1 | 10/2011 | Cetinkaya et al. | | |
| 2012/0004819 A1 | 1/2012 | Lu et al. | | |
| 2012/0083983 A1 | 4/2012 | Danz et al. | | |
| 2015/0210256 A1 * | 7/2015 | Yamashita | ............... | B60T 7/22 303/14 |

FOREIGN PATENT DOCUMENTS

| | | |
|---|---|---|
| DE | 102005060298 A1 | 6/2007 |
| DE | 102008042963 A1 | 10/2008 |
| DE | 102010055943 A1 | 8/2011 |

* cited by examiner

METHOD AND DEVICE FOR AUTONOMOUS BRAKING OF A VEHICLE FOLLOWING COLLISION

CROSS-REFERENCE TO RELATED APPLICATIONS

This application is a continuation of U.S. patent application Ser. No. 14/489,787 filed Sep. 18, 2014, which is a continuation of co-pending U.S. patent application Ser. No. 13/791,526 filed Mar. 8, 2013, which claims priority to German Patent Application No. DE 102012203733.0 titled "Method and Device for Autonomous Braking of a Vehicle Following a First Collision" filed Mar. 9, 2012, which are hereby incorporated by reference in their entireties.

TECHNICAL FIELD

The present invention relates to vehicle braking controls and collision mitigation control algorithms and devices.

BACKGROUND

During a collision, a vehicle can generate or exhibit predetermined movements indicative of a probability of collision. Modern vehicles can incorporate collision mitigation systems (CMS) or collision avoidance for driver assistance systems (CADS). Still, there exists a desire for additional post-collision mitigation systems.

SUMMARY

The present disclosure addresses one or more of the above-mentioned issues. Other features and/or advantages will become apparent from the description which follows.

One advantage of the present disclosure is that it provides an alternative post-collision mitigation system to existing collision mitigation systems.

One exemplary embodiment relates to a method for autonomous braking of a motor vehicle during a collision, the method including: (i) detecting a collision; (ii) detecting a predetermined movement by the motor vehicle following the collision; and (iii) initiating an autonomous braking process if a driver has not initiated the braking process.

One exemplary embodiment relates to a device for autonomously braking a motor vehicle following a collision, including: a controller having: (i) a braking algorithm; and (ii) a detection unit configured to detect a predetermined movement of the motor vehicle and detect the collision. The braking algorithm is configured to output a signal for initiating the braking process according to detection of the predetermined movement and a collision.

Another exemplary embodiment relates to a method controlling a vehicle braking system, the method including: (i) detecting whether a collision has occurred; (ii) detecting whether a predetermined condition follows the collision; (iii) determining whether a driver has applied the brakes; and (iv) wherein when a driver has not applied the brakes, autonomously initiating braking.

The invention will be explained in greater detail below by way of example with reference to the figures, in which the same reference numbers are used in the figures for identical or essentially identical elements. The above features and advantages and other features and advantages of the present teachings are readily apparent from the following detailed description for carrying out the invention when taken in connection with the accompanying drawings. In the figures:

BRIEF DESCRIPTION OF THE DRAWINGS

The drawings are only used to explain the invention and do not restrict it. The drawings and the individual parts are not necessarily to scale. The same reference numbers denote the same or similar parts.

DETAILED DESCRIPTION

Figure 1:
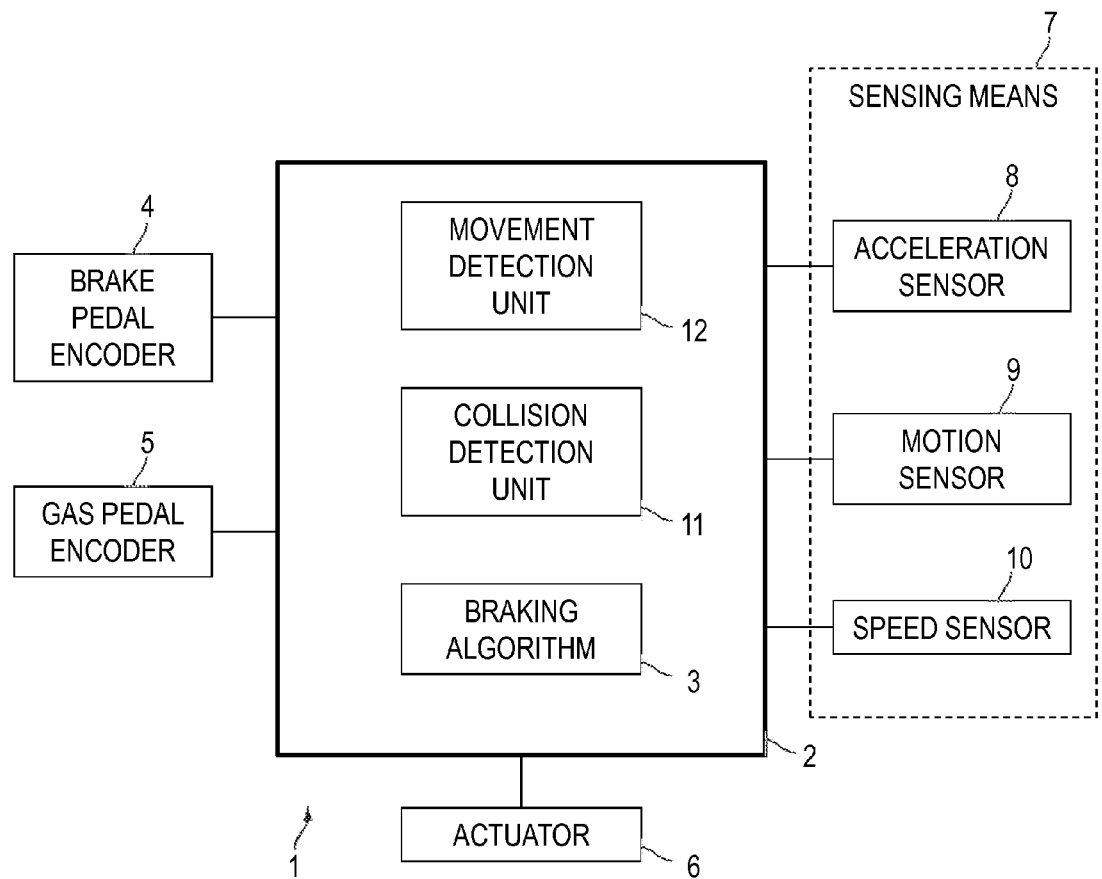
FIG. 1 is a schematic depiction of an autonomous braking system for a motor vehicle.

Turning now to the figures, there is shown a method for controlling a vehicle braking system independent of driver input. A system for effectuating the same is also illustrated.

According to a first aspect of the invention, a method for autonomous braking of a motor vehicle includes the following steps: (1) detecting a first collision; (2) detecting a predetermined (and in some instances an undesirable) movement of the motor vehicle following the collision; (3) initiation of an autonomous braking process after detecting the collision and predetermined movement, if a driver has not initiated a braking process.

The autonomous braking strategy seeks to reduce kinetic energy of the motor vehicle during a collision event. The autonomous braking process, i.e. a braking process initiated and carried out by the brake system or control system, can be initiated independent of the driver. Thus, for example, in the event of a driver initiated braking process, an autonomous braking process can be initiated which then overrides the driver braking process. In one embodiment, an autonomous braking process is initiated if an undesirable movement is detected following a driver aborted braking process. Thus, the consequences of human error or an impairment of the driver as a result of the collision can be mitigated.

Following detection of the collision, the brake system can be preloaded, for example by requesting a small amount of braking force and/or by reducing the trigger threshold of the brake system, thus enabling a faster response. With the request for a small amount of braking force the brake calipers are moved closer to the brake disk in order to allow faster response.

The movement of the motor vehicle can be monitored in response to the braking process—that of the driver and/or the autonomous one. The reaction of the driver can be monitored in response to the braking process. This can support the decision as to whether and in what form an autonomous braking process is initiated, maintained and/or ended or in what form the driver or the vehicle is assisted.

In one embodiment, the collision is detected from activation of an airbag, from the fuel supply being cut off and/or from measured values of at least one motion sensor. Using the measurement values and/or calculations for speed changes, the severity (or a severity rating) of the accident can be computed. Thus, for example, multiple values can be compared with predefined threshold. The intensity of the accident or the accident severity can be computed or estimated therefrom. This information can be used for the autonomous brake system and/or other systems for adequate countermeasures.

The support for the brake system can be terminated following the fulfillment of a termination criterion. It can be provided to activate the support of the brake system for only a specific emergency situation time interval and thereafter to return to normal operation or a different state. The termination criterion can, for example, be stabilization of the motor vehicle, whereby the normal safety systems are again functional for a specific time period, e.g. 2.5 seconds, or the motor vehicle is stationary.

According to a further aspect of the invention, a device for autonomous braking in a motor vehicle following a collision comprises a controller with a braking algorithm; whereby the controller comprises a detection unit for a collision, a detection unit for an undesirable movement of the motor vehicle and a signal output for a brake control signal for initiating the braking process according to the braking algorithm based on the detection of the collision and the undesirable movement. This device can carry out the method described above efficiently and safely. The same advantages and modifications apply.

The device for braking support in one arrangement includes a sensing means for detecting the collision, whereby the sensing means produces the collision signal. If the sensing means is part of the device for braking support, this can have the advantage of a clearly defined and complete system, which, for example, comes into effect in the production and maintenance of software or for any upgrades. The sensing means includes a speed, yaw rate, acceleration, air pressure, image processing and/or sound sensor.

Referring now the figures, FIG. 1 shows a schematic depiction of a circuit diagram for a device for autonomous braking. A braking device 1 for a motor vehicle assists a driver of the motor vehicle during a braking process, in particular following a collision. The braking device or system 1 includes a controller 2, in which a braking algorithm 3 is deposited, for example in a non-volatile memory.

The controller 2 is connected to a brake pedal encoder 4 and a gas pedal encoder 5, which, for example, is configured to measure a force or speed of a pedal movement by the driver and output a corresponding measurement value to the controller 2. An actuator 6 of the brake system, such as for example a hydraulic pump or an active brake booster is controlled accordingly by the controller 2 in order to prepare or initiate a braking process.

Furthermore, the controller 2 is connected to a sensing means 7 for collision detection. The sensing means 7 here comprises acceleration sensors 8 for recording longitudinal and lateral accelerations, motion sensors 9 for recording yaw and roll rates and speed sensors 10 for recording wheel speeds. These sensors provide signals to the controller 2, which detects a collision using the signals via collision detection logic or a detection unit 11. Other inputs for detecting a collision can be, for example, various flags, such as triggering of an airbag or an interruption of fuel supply. Controller 2 can also be connected to other driver assistance systems.

Furthermore, controller 2 contains a detection unit 12, as shown in FIG. 1, for detecting a predetermined movement of the motor vehicle. Detection unit 12 detects an undesirable movement on the basis of the signals, e.g., of wheel speed, acceleration or motion sensors. An undesirable movement can, for example, be detected from an abrupt change of the speed or distance.

Figure 2:
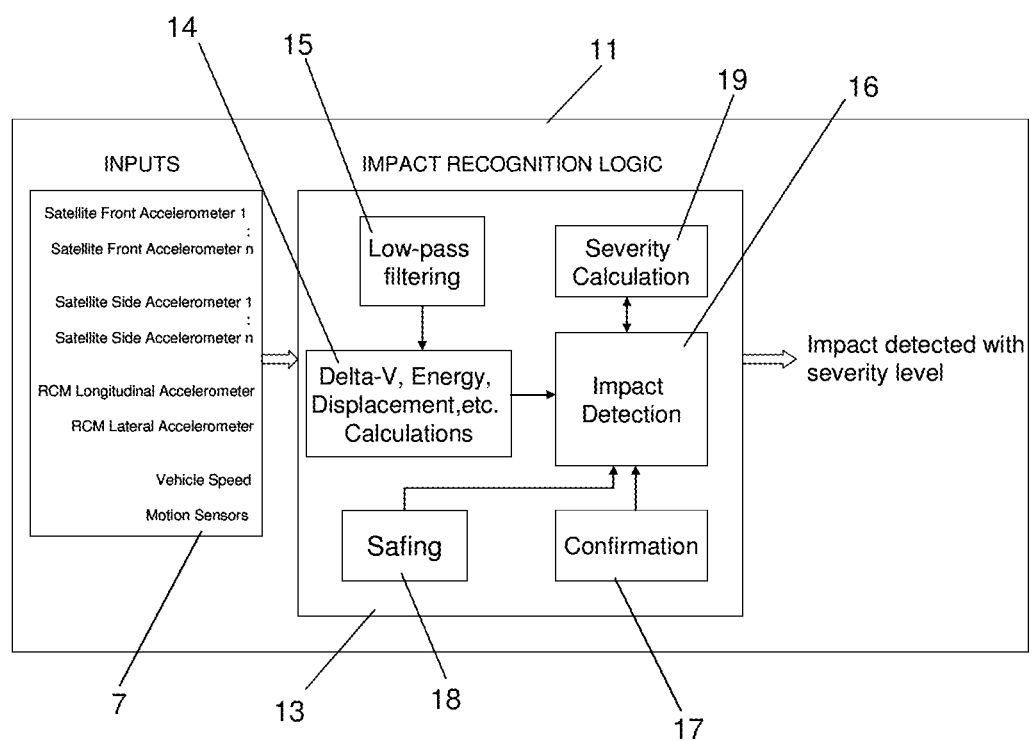
FIG. 2 is a schematic depiction of collision detection logic for the system of FIG. 1.

FIG. 2 shows a detailed illustration of the detection unit for a collision 11. The sensing means 7 includes, for example, satellite accelerometers, which are arranged on a front and the sides of the motor vehicle. These sensors typically have ranges of about −250 g through +250 g. Furthermore, the longitudinal and lateral acceleration values from a restraint system, such as a Restraint Control Module (or RCM) can be used as inputs. These sensors typically have ranges of about −50 g through +50 g.

The speed of the motor vehicle and signals from motion sensors are provided as other inputs. In some cases, wheel speeds or vehicle speeds based on the gearbox or the force transfer are good indicators of the speed of the vehicle. Thus, it can be advisable to determine a reference speed of the vehicle that is based on various speed estimates during the period of PIB activation. Information from motion sensors, such as a yaw rate and a roll rate, which are used, for example, in brake control modules (BCMs), can also be used.

In some embodiments, a driver intention is detected from gas pedal position, the brake pedal position and the steering angle.

These inputs are connected to logic 13 for detection of an impact or a collision. The purpose of this logic 13 is to detect a collision that either produces an instability of the vehicle or a significant change of the initial kinetic energy of the vehicle, as soon as possible. The collision can either impart rotational energy or translational energy to the vehicle.

The logic 13 for detection of a collision carries out various computations 14 such as a change of speed, energy and vehicle displacement. These computations are filtered, for example with a low pass filter 15. The result is the detection 16 of a collision. This result is assured with confirmation functions 17 and protective functions 18.

The algorithm for the detection of a collision is used to activate countermeasures that have been specified by the brake system 1, of FIG. 1, and/or other controllers. The algorithm or the calculation detects all types of collisions that lead to an increase in the speed of the vehicle, produce a rotation of the vehicle or produce a loss of control over the vehicle. A result of the algorithm does not just have to be limited for triggering an airbag. A sensitivity of the logic 13 or of the algorithm should be higher, in particular significantly higher, than that of the restraining modules or controllers.

Figure 3:
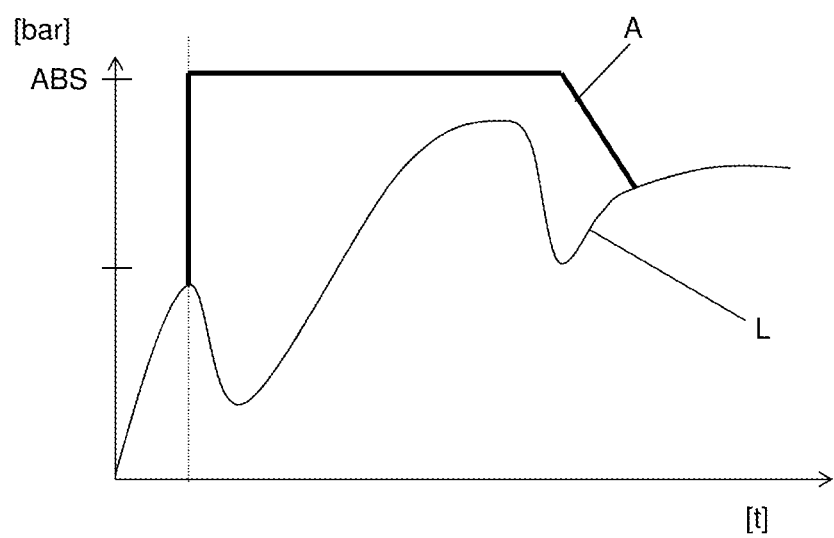
FIG. 3 is a plot of a brake pressure profile against time for a braking system.

FIG. 3 shows an illustration of a braking pressure against time. Line, L, shows a braking pressure profile produced or requested by the driver. Line, A, shows a braking pressure of the brake assistance system. The brake assistance system regulates the braking pressure to a full ABS braking pressure and slowly takes the pressure off when a driver releases the brake pedal. If the driver, upon detection of a collision and an undesirable movement following collision, does not initiate a braking process, an autonomous braking process is initiated that sends an active request for a braking pressure that can be limited by the ABS.

If the driver releases the brake pedal during braking and the vehicle is still showing undesirable movements, an autonomous braking process is initiated. The response of the motor vehicle to the braking processes following the collision can be monitored. Thus decisions can be supported, as to how the current brake operations can be adapted or whether the brake operations can be aborted.

The reaction of the driver to the braking processes can be monitored, in order to support the decision between the braking modes, for example, the change from autonomous braking (AB) to braking assistance, or in order to terminate an active braking operation, if there is a clear indication that the driver can control the movement of the vehicle.

The autonomous braking process can be terminated if the vehicle is stabilized in a region that can be managed by ESC or normal CMS functions, or if the time period since the collision is long enough, for example 2.5 seconds, or if the vehicle has stopped or if there is a driver override, for example if the driver has activated the gas pedal for the first time.

There can be a conflict resolution between received data. It can thus be excluded that part or all of the brake assistance system is shut down because of a sensor fault, possibly caused by the collision. Furthermore, safety systems can be provided with a priority, for example an impact-based brake assistance system can be allocated a higher priority or credibility than a brake assistance system that is based on an image processing sensor. Thus different safety systems or control systems, which could request braking processes via the same interfaces, can be compared or coordinated.

Figure 4:
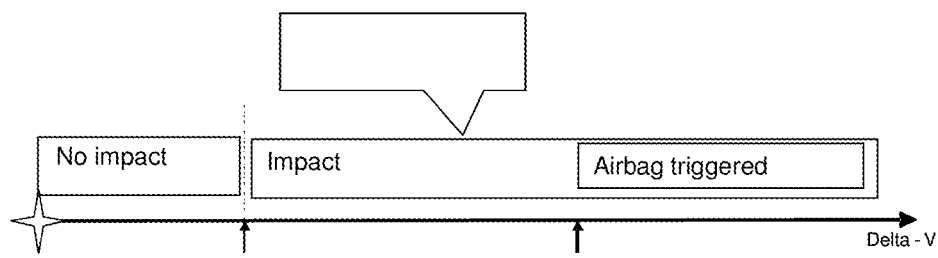
FIG. 4 is a sensitivity rating chart for collision detection systems.

FIG. 4 shows the difference between the intensities of a collision detected by the algorithm for the detection of a collision and the triggering of an airbag. The intensity or the degree of intensity of the collision is measured on the basis of a measured change in speed (Delta-V) or calculated speed changes. The sensitivity of the algorithm is approximately twice as great as for an airbag system, i.e., the triggering threshold is about half the magnitude. An accident severity of the collision is computed in a computational unit 19, as shown in FIG. 2, using the calculations and/or the reference values. The detection unit for a collision 11 (of FIG. 2) then outputs a signal that indicates a collision with a degree of intensity of the collision. The two components of the signal, i.e. confirmation of the collision and the degree of intensity of the collision, can be output together or with a time offset.

In addition to the function of preparation of the required information for initiating countermeasures following a collision, the results of the detection unit for a collision 11 are also used for a vehicle state calculation 20, for example, to update longitudinal and lateral speeds following a collision.

Figure 5:
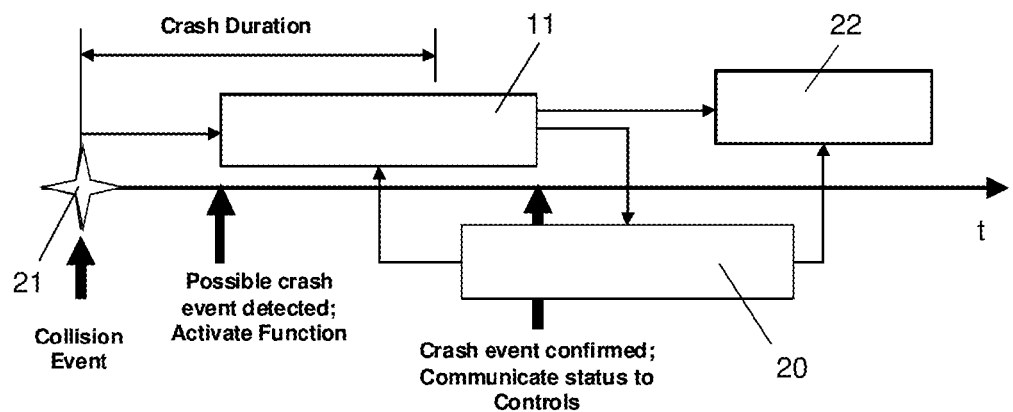
FIG. 5 illustrates a chronology profile for collision detection according to the system of FIG. 1.

FIG. 5 shows the chronology and interactions of an algorithm for the detection of a collision with other systems following a collision 21. Following a collision event 21, the detection unit 11 confirms whether collision has occurred or not. As soon as the collision has been confirmed by the detection unit 11, the relevant information is passed to a state calculation 20 and to one or more controllers 22.

The algorithms for a frontal impact, a side impact and an interruption of the fuel supply can also trigger autonomous braking following a collision. In the frontal and lateral impact algorithms, additional calculations are carried out in order to activate restraining mechanisms, such as an airbag and a tensioner. Likewise, the lateral impact algorithm can use additional satellite pressure sensors in its calculation and the frontal impact algorithm can use the yaw rate sensor in its calculation.

The function for the detection of a collision can be extended by the use of data of ambient sensors or ambient motion sensors prior to the collision, in order to determine the exact position and the surroundings of the vehicle prior to and during the collision. These items of information can help to predict the degree of severity of the collision and/or to adapt reference thresholds or values, in order, for example, to set a fast or slow response. The following types of information can be used as a motion sensor; the vehicle's speed during the collision, the position of the vehicle during the collision, such as for example, being positioned on an expressway, in rural or urban area, and in the presence of other objects at the front, the sides and the rear of the vehicle.

The position of the vehicle can be determined by using information that identifies a location of the vehicle on a map. Sensors for the position can include global positioning sensors (or GPS), maps and cameras.

An overview of the further processing of the signals is first given below. During the detection of a collision, various cases are taken into consideration, which can also be filed as default values, models or reference values or reference thresholds in the detection units 11 or 12. These cases include, for example, a collision between two vehicles as a rear-end collision, a lateral collision or as a collision at an angle.

During the determination of predetermined movement following the collision, various cases are considered, which can also be filed as default values, models or reference values or reference thresholds in system/unit 11 or system/unit 12. These cases include, for example, undesirable movements such as longitudinal or lateral movements, undesirable yawing and rolling. If, following the collision the speed of the vehicle is considerably reduced, for example below a defined threshold of e.g. 8 km/h, the movement following the collision can be classified as not an undesirable movement.

After a collision and an undesirable movement following the collision have been detected, a collision flag and a flag for the undesirable movement following the collision are set.

Next, the brake system is preloaded. Because this engagement is not noticed by the driver, it can be immediately induced if there is a suspicion of the existence of a collision. A dedicated flag that can be reset by a PIB (Post Impact Braking) activation flag that can request pre-charging of the brake from an external module. A confirmation can then take place that the collision and the undesirable movement are confirmed.

The autonomous brake system 1 can take over the function of a brake assistance system (or Emergency Brakes Assist, EBA). The EBA function is activated by the PIB activation flag and not, as with CMS/CADS systems prior to an impact, by an optically based sensor. Here, after detection of a collision and an undesirable movement following the collision, an emergency braking process is initiated if the driver initiates a braking process. The emergency braking process produces full braking pressure even if the driver produces less pedal pressure. The additional pressure is produced by a brake booster.

Figure 6:
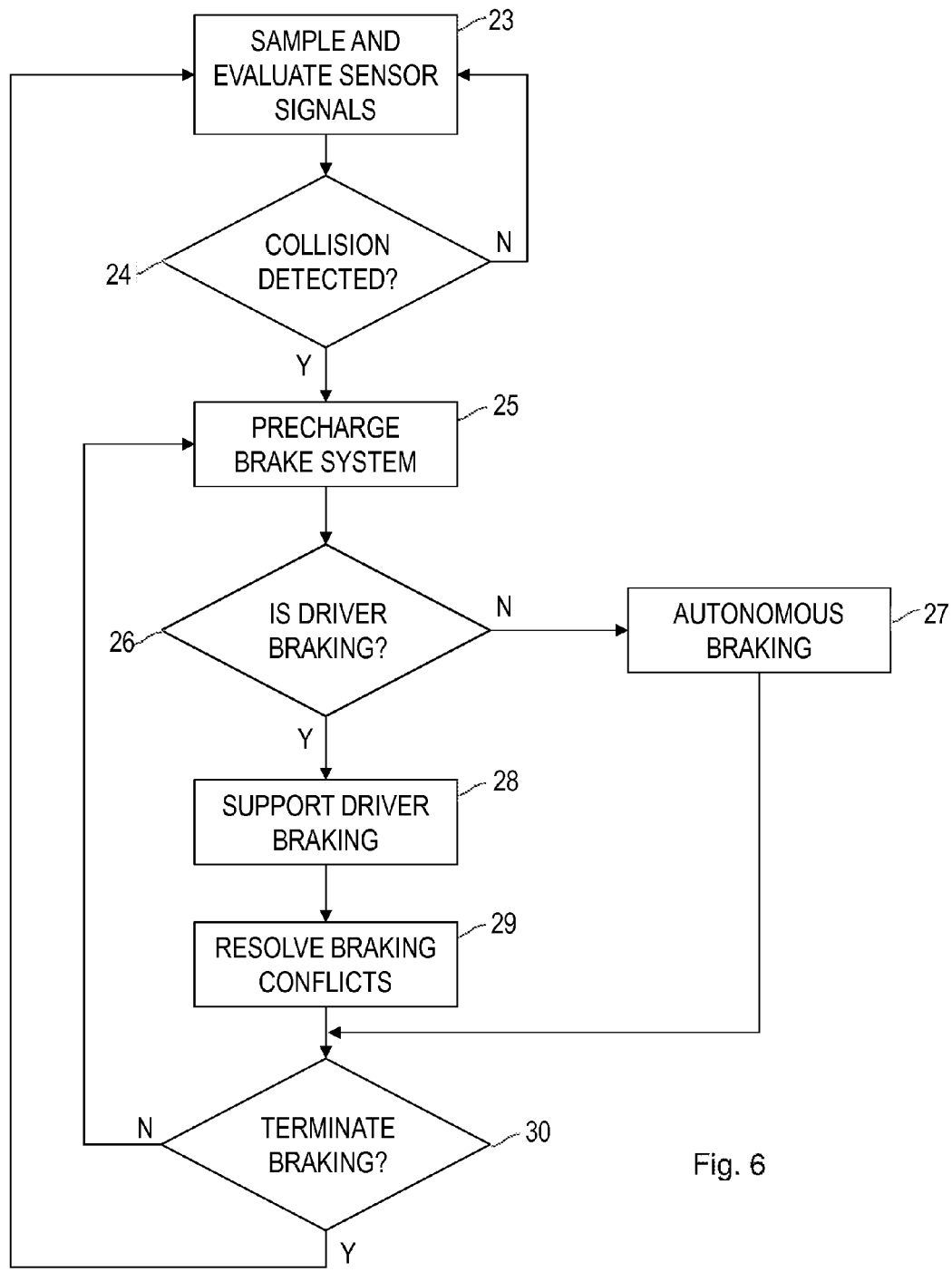
FIG. 6 is a flow diagram of a method for autonomous braking of a motor vehicle according to an exemplary embodiment of the present disclosure.

Now turning to FIG. 6 which shows steps of a method for an autonomous brake function following a collision. During normal driving operation (at step 23) the controller 2 continuously samples the sensor signals and evaluates them. At step 24 the controller decides whether a collision exists or not. This takes place according to the following criteria, whereby the following abbreviations and terminology are used:

longitudinal acceleration: $a_x$
lateral acceleration: $a_y$
yaw rate: $\omega_z$
roll rate: $\omega_x$
wheel speeds: $\omega_i$
vehicle reference speed: $v_x$ flag indicating the impact phase: InImpact
flag in an uncontrollable impact: InUncontrollableImpact
flag indicating the post impact phase: PostImpact
deactivation override flag: DeactivationOverride Interruption of the fuel supply is detected. A fuel supply will be interrupted, for example if the longitudinal speed and/or lateral speed exceed or fall below a defined threshold.

Figure 7:
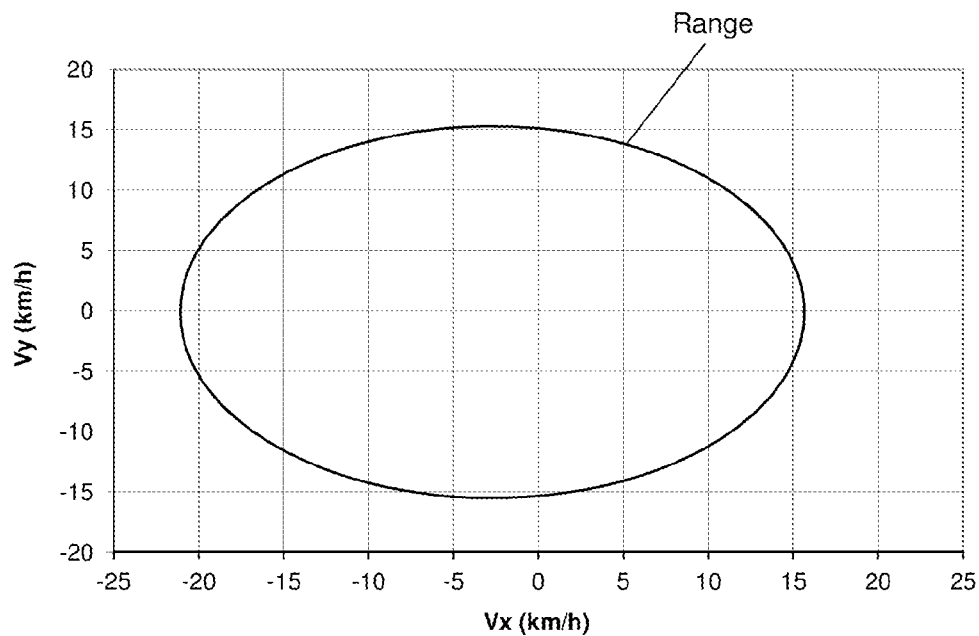
FIG. 7 is a diagram for an exemplary triggering of interruption of a fuel supply.

FIG. 7 shows the limits or "range" for the longitudinal speed and the lateral speed. A modified fuel supply can be used with a reduced threshold value as a trigger for the braking algorithm.

Airbag trigger signals can further trigger the detection of a collision. Modified signals that increase or reduce the sensitivity of the braking assistance algorithm, can also be used here. Electronic stability control (or ESC) sensor values can be used as further triggers for the detection of a collision.

Even assuming a sensor fault, a collision can be detected with the ESC motion sensors. The following variables are used: the last three values of the longitudinal acceleration; the last three values of the yaw rate; or relayed values of the real wheel speeds. In an initialization, the sensor signals, calculated variables and flags that are set in the range of the input variables are received and a global counter is started. System counters and timers are set accordingly.

The gradients of the longitudinal accelerations are calculated with the last four sampled values for preparation of the longitudinal acceleration.

$$da_y = a_y - a_y[z_1]$$

$$da_y[z_1] = a_y[z_1] - a_y[z_2]$$

$$da_y[z_2] = a_y[z_2] - a_y[z_3]$$

and the average gradient of the longitudinal acceleration during the last four sampled values are calculated as follows:

$$d_4 a_y = a_y - a_y[z_3]$$

It should be noted that the delta value is calculated over a sample time of 10 ms, $d_4 a_y$ is averaged over four sample values, i.e. over 40 ms.

For preparation of the yaw rate, the gradients of the yaw rates are calculated with the last four sampled values.

$$d\omega_z = \omega_z - \omega_z[z_1]$$

$$d\omega_z[z_1] = \omega_z[z_1] - \omega_z[z_2]$$

$$d\omega_z[z_2] = \omega_z[z_2] - \omega_z[z_3]$$

and the mean gradient of the yaw rate during the last four sampled values:

$$d_4 \omega_z = \omega_z - \omega_z[z_3]$$

It is to be noted that the delta value is calculated over a sampling time of 10 ms, $d_4 \omega_z$ is averaged over four sampled values, i.e. over 40 ms. For preparation of the anticipated yaw rate, the yaw rate based on the wheel speeds is calculated using the sensor signals for the speeds of the two rear wheels.

$$\omega_{zwssr} = (w_2 + w_2[z_1] - w_3 - w_3[z_1])/2/t_r$$

$t_r$ is the rear axle displacement.

The gradients of the longitudinal accelerations are calculated with the last four sampled values for preparation of the longitudinal acceleration.

Figure 8:
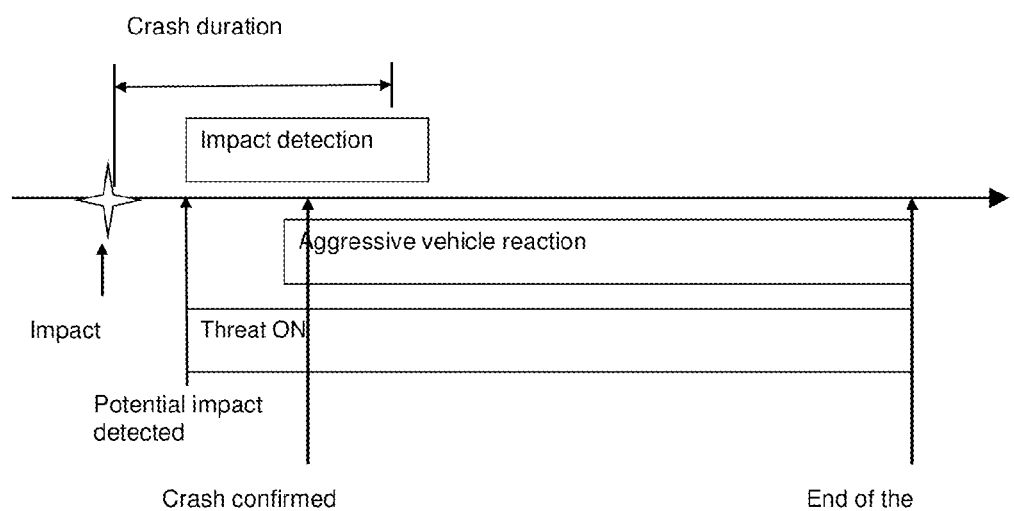
FIG. 8 illustrates a chronology profile for braking control.

A brake control time sequence is shown in FIG. 8. Following a collision 21, a potential collision is detected, which entails the activation of a threat flag or hazard flag (Threat ON). Somewhat later, an aggressive or undesirable reaction or movement of the vehicle is detected and a corresponding flag is activated. In parallel with this, the collision is confirmed. If the effects diminish or the driver takes over control, the flags and the actions are stopped or reset.

If the wheel speeds are outside a normal range for ABS operation, brake control based on a slip ratio is replaced by brake control not based on a slip ratio, i.e. the system is not changed to the ABS mode. Instead, a fixed amount of braking pressure $P_{pibamax}$ is sent to all wheels, which is close to the maximum efficiency of the braking pressure. If there is no collision according to the conditions and conflict resolutions, branching back to step 23 occurs. In the case of a collision, branching to step 25 occurs. In step 24 an undesirable movement following a collision is also detected.

The brake system is pre-charged in step 25. For this purpose, following detection of the impact as determined by the flag PostImpact, a smaller amount of braking pressure $P_{precharge}$ is produced to be sent to the brake calipers in order to prevent potential hydraulic delays. Likewise, the sensitivity of the brake system can be increased in order to assist in faster braking initiation.

In step 26 it is detected whether the driver has an intention to brake. For this purpose, following the registration of the impact it is determined whether the driver is reacting to the event by releasing the gas pedal and possibly preparing for a braking process. To this end the controller 2 receives signals related to the positions and/or movements of the pedals from the gas pedal encoder 5 and/or the brake pedal encoder 4.

If it is indicated that the driver has no intention to brake, the algorithm branches to a step 27, according to which autonomous braking takes place. In the event of a detected intention to brake, branching to step 28 takes place in order to support the braking process with the brake system based on the detection of the driver's intention to brake and the collision.

In step 29, conflicts between brake functions are resolved. Thus control signals, which are output for example by a brake assistance system based on image processing sensors, are overridden by the brake system described, which is based on the determination of the collision. This is advantageous, because the brake system described here is more reliable in the state following an impact.

Similar requests to the brake system 1 can be generated by other (software) modules, such as for example PIBA, ESC/RSC, TCS/ABS, CMbB (Collision Mitigation by Braking) or ACC (Adaptive Cruise Control).

Thus a decision strategy is provided to send a one-time or unique request for triggering the brakes. A solution is proposed here using the maximum function.

In step 30 it is decided whether the support of the brake system is terminated after fulfillment of a termination criterion. If this is the case, branching back to step 23, the normal mode, takes place. If there is no termination criterion, branching to step 25 takes place. Also step 27, according to which an autonomous braking process is active, branches to step 30. The termination criterion can, for example, be stabilization of the motor vehicle, whereby the normal safety systems are operational again, or a defined time period, for example 2.5 seconds, or the motor vehicle being stationary or if the driver operates the gas pedal for the first time post-collision or releases the brakes.

If the driver stops braking, but some other measurement values, such as a large yaw rate or a high speed of a wheel, are outside of normal values, the brake system continues to assist the braking process, until these values are within the normal range.

If the driver activates the brakes, but some other measurement values, such as a large yaw rate or a high speed of one or more wheels, are outside of normal values, the brake system does not allow the braking process.

If the driver deactivates the brakes too early, the brake system continues to brake until for example a time period of 2.5 seconds has elapsed after setting the flag for the collision.

This function calculates three binary outputs; brake override, steering override and gas pedal override. The brake override flag is set if the driver has braked and has just released the brake pedal. In this case the flag remains set for a defined period, for example of about one second.

Those familiar with the art to which this invention relates will recognize various alternative designs and embodiments for practicing the invention within the scope of the appended claims.

We claim:

1. A method of controlling a vehicle, comprising:
providing a vehicle having a brake system configured to operate according to a nominal mode, a first active braking mode, and a second active braking mode, wherein in the nominal mode an applied braking pressure is based on a driver braking request, in the first active braking mode the applied braking pressure is based on a maximum braking pressure and decreased in response to a driver release of a brake pedal, and in the second active braking mode the applied braking pressure is based on the maximum braking pressure;
in response to a detected collision, controlling the brake system according to the first active braking mode;
in response to the first active braking mode being active and no driver braking request being anticipated, controlling the brake system according to the second active braking mode; and
in response to the first active braking mode or second active braking mode being active and a termination criterion being satisfied, controlling the brake system according to the nominal mode.

2. The method of claim 1, wherein the termination criterion includes the vehicle being stabilized, a calibratable time interval expiring, or a driver actuation of a gas pedal.

3. The method of claim 2, wherein the vehicle being stabilized is determined based on a motion sensor reading falling below a predefined threshold.

4. The method of claim 1, further comprising, in response to the first active braking mode being active, a driver braking request being received, and the driver braking request being discontinued when a motion sensor reading exceeds a threshold, controlling the brake system according to the second active braking mode.

5. The method of claim 1, wherein the collision is detected based on an airbag activation, a fuel supply shutting down, or a motion sensor reading exceeding a predefined threshold.

6. A vehicle, comprising:
a brake system; and
a controller configured to in response to a detected collision, control the brake system according to a first braking mode in which applied braking pressure is based on a maximum braking pressure and decreased in response to a driver release of a brake pedal, to in response to the first braking mode being active and no driver braking request being anticipated, control the brake system according to a second braking mode in which applied braking pressure is based on the maximum braking pressure, and to in response to the first active braking mode or second active braking mode being active and a termination criterion being satisfied, control the brake system according to a nominal mode in which applied braking pressure is based on a driver braking request.

7. The vehicle of claim 6, wherein the termination criterion includes the vehicle being stabilized, a calibratable time interval expiring, or a driver actuation of a gas pedal.

8. The vehicle of claim 7, wherein the vehicle being stabilized is determined based on a motion sensor reading falling below a predefined threshold.

9. The vehicle of claim 6, wherein the controller is further configured to, in response to the first active braking mode being active, a driver braking request being received, and the driver braking request being discontinued when a motion sensor reading exceeds a threshold, control the brake system according to the second active braking mode.

10. The vehicle of claim 6, wherein the collision is detected based on an airbag activation, a fuel supply shutting down, or a motion sensor reading exceeding a predefined threshold.

11. A method of controlling a vehicle comprising:
automatically controlling brakes with a controller to provide braking torque based on a maximum braking pressure in response to a collision detected based on a yaw rate compared to an average gradient of yaw rate among a plurality of yaw rate samples, and further based on a longitudinal acceleration parameter compared to an average gradient of longitudinal acceleration among a plurality of acceleration measurement samples.

12. The method of claim 11, further comprising, in response to a driver braking request being received and a motion sensor reading falling below a threshold, automatically controlling the vehicle brakes to decrease braking pressure in response to a driver release of a brake pedal.

13. The method of claim 12, further comprising, in response to the driver braking request received, a driver release of the brake pedal, and the motion sensor reading being above the threshold, automatically controlling the vehicle brakes to maintain the braking torque based on the maximum ABS braking pressure.

14. The method of claim 11, further comprising, in response to a termination criterion being received, discontinuing the automatic controlling of the vehicle brakes.

15. The method of claim 14, wherein the termination criterion includes a motion sensor reading falling below a threshold, a calibratable time interval expiring, or a driver actuation of a gas pedal.

* * * * *